US012809508B2

(12) United States Patent
Smith et al.

(10) Patent No.: US 12,809,508 B2
(45) Date of Patent: Nov. 24, 2026

(54) GRAPHICAL USER INTERFACE FOR MODIFYING HUE, SATURATION, AND LUMINANCE PARAMETERS OF IMAGE COLORS

(71) Applicant: Adobe Inc., San Jose, CA (US)

(72) Inventors: Benjamin Smith, Seattle, WA (US); Yaniv De Ridder, San Francisco, CA (US); William Ruby, San Francisco, CA (US); Benjamin Farrell, Hayward, CA (US); Alexis Van Hurkman, St. Paul, MN (US)

(73) Assignee: ADOBE INC., San Jose, CA (US)

( * ) Notice: Subject to any disclaimer, the term of this patent is extended or adjusted under 35 U.S.C. 154(b) by 163 days.

(21) Appl. No.: 18/958,174

(22) Filed: Nov. 25, 2024

(65) Prior Publication Data

US 2026/0147464 A1 May 28, 2026

(51) Int. Cl.
*G06F 3/04845* (2022.01)
*G06T 11/10* (2026.01)

(52) U.S. Cl.
CPC .......... *G06F 3/04845* (2013.01); *G06T 11/10* (2026.01)

(58) Field of Classification Search
None
See application file for complete search history.

(56) References Cited

U.S. PATENT DOCUMENTS

| | | | | |
|---|---|---|---|---|
| H1506 H * | 12/1995 | Beretta | H04N 1/62 345/549 |
| 9,299,168 B2 * | 3/2016 | Ubillos | G06T 11/10 |
| 2009/0297022 A1 * | 12/2009 | Pettigrew | H04N 1/62 382/162 |
| 2012/0019550 A1 * | 1/2012 | Pettigrew | G06T 11/60 345/593 |

(Continued)

OTHER PUBLICATIONS

Piet: Facilitating Color Authoring for Motion Graphics Video (Shi, Xinyu, et al. "Piet: Facilitating color authoring for motion graphics video." Proceedings of the 2024 CHI Conference on Human Factors in Computing Systems. 2024.) (Year: 2024).*

(Continued)

*Primary Examiner* — Nurun Flora
(74) *Attorney, Agent, or Firm* — Polsinelli LLP

(57) ABSTRACT

Disclosed embodiments may provide techniques for modifying hue, saturation, and luminance (HSL) parameters across different colors depicted on an image. A computer-implemented method can include providing a set of color sub-spectrums extracted from an image. The method can also include displaying, on a graphical user interface, an interactive graph for a particular color sub-spectrum of the set of color sub-spectrums. The method can also include selecting one or more colors of the particular color sub-spectrum in response to a first interaction relative to a first dimension of the interactive graph. The method can also modifying HSL parameters associated with the one or more colors in response to a second interaction relative to a second dimension of the interactive graph. The method can also (Continued)

include generating a color-adjusted image by applying the modified HSL parameters to one or more pixels of the image.

20 Claims, 6 Drawing Sheets
(3 of 6 Drawing Sheet(s) Filed in Color)

(56) References Cited

U.S. PATENT DOCUMENTS

| | | | | |
|---|---|---|---|---|
| 2012/0210229 | A1* | 8/2012 | Bryant | G06T 11/10 715/723 |
| 2013/0202203 | A1* | 8/2013 | Bryant | G06T 11/10 382/167 |
| 2013/0239056 | A1* | 9/2013 | Ubillos | G06T 11/60 715/833 |
| 2015/0365600 | A1* | 12/2015 | Pollack | H04N 5/2621 348/239 |

OTHER PUBLICATIONS

Color Manipulation in Images by Using a Modified HSV Algorithm (Kosolapov, Samuel. "Color Manipulation in Images by Using a Modified HSV Algorithm." (2023): 1-6.) (Year: 2023).*

* cited by examiner

GRAPHICAL USER INTERFACE FOR MODIFYING HUE, SATURATION, AND LUMINANCE PARAMETERS OF IMAGE COLORS

FIELD

The present disclosure relates generally to modifying various color parameters of images and videos. In one example, the systems and methods described herein include a graphical user interface for adjusting hue, luminance, and saturation (HSL) of colors depicted by images and videos.

BACKGROUND

Image-editing applications provide a wide range of graphical user-interface features that allow users to enhance, manipulate, and transform digital images. For example, an image-editing application facilitates color correction of images, in which brightness, contrast, saturation, and color balance of the images are modified to enhance their overall visual appearance. In addition, the image-editing applications also provide cropping, resizing, and rotating images to fit specific dimensions or orientations. Other example features include removing unwanted artifacts and applying filters or effects to create artistic styles. These applications are widely used in photography, graphic design, and video production to generate high-quality visual content.

Hue, luminance, and saturation (HSL) parameters are some of many components used for manipulating color characteristics of images. Hue identifies a particular type of color. Saturation identifies an intensity or purity of the color. For example, higher saturation results in more vivid colors, while lower saturation results in in colors appearing muted or gray. Luminance identifies brightness of the color, in which higher values make the color appear brighter and lower values make the color appear darker. One or more of the HSL parameters are modified to facilitate precise control over the visual appearance of colors in the images and achieving the desired color balance of the images.

SUMMARY

Disclosed embodiments may provide a user interface that facilitates modifications to HSL parameters across different colors in a color spectrum, while providing immediate visual feedback based on the modifications. A computer-implemented method includes a content-editing application extracting colors from an input image and provide a set of color sub-spectrums (e.g., red to orange-red, yellow to yellow-green, blue to violet) on the user interface. A user interacts with the user interface to select a particular color sub-spectrum of the set. In response to the selection, the user interface displays a set of control elements for the selected color sub-spectrum (e.g., red to orange-red). For example, a first control element is associated with a hue category, a second control element is associated with a saturation category, and a third control element is associated with a luminance category. The user selects a particular control element presented in the user interface to modify the corresponding HSL parameter.

Once the particular control element is selected, the content-editing application generates an interactive graph for the corresponding HSL category. The interactive graph displays a distribution of color frequencies of the image within the selected color sub-spectrum. The user interacts with the interactive graph across different axes to adjust the HSL parameter. The interaction can result in modifying color properties of the input image according to the adjusted HSL parameter. In addition, the content-editing application dynamically modifies the distribution of color frequencies shown in the interactive graph to reflect the adjusted HSL paramterss.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

Figure 1:
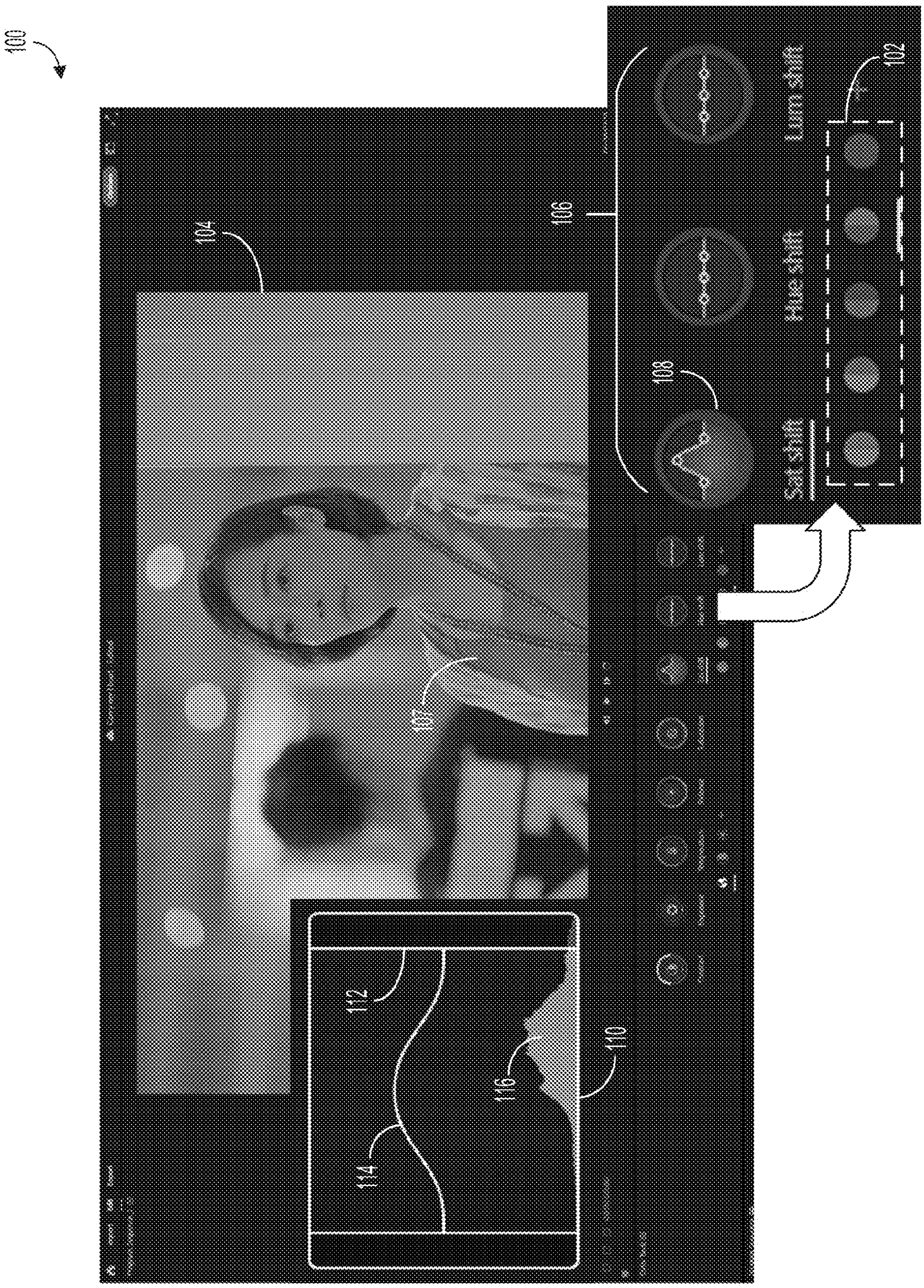
FIG. 1 illustrates an example screenshot of a graphical user interface for modifying hue, saturation, and luminance parameters across different colors depicted on an image, according to some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word “exemplary” is used herein to mean “serving as an example, instance, or illustration.” Any embodiment or design described herein as “exemplary” is not necessarily to be construed as preferred or advantageous over other embodiments or designs.

To adjust HSL of colors in a given image, existing techniques typically require extensive manual control with numerous clicks and adjustments across a graph representing an entire visible light spectrum. Such user interfaces are confusing and time-consuming for users for adjusting colors of the given image. Moreover, the existing techniques do not consider that hue, luminance, and saturation of colors have an interdependent relationship to each other. For example, adjusting luminance indirectly affects the perceived saturation or hue of a particular color. Similarly, adjusting saturation indirectly affects the perceived luminance or hue of the particular color. However, the existing techniques do not provide user interfaces that effectively convey such interdependent relationships. The existing techniques are also unable to propagate the modified HSL parameters to different video frames.

To address these above-noted deficiencies, the present techniques provide a user interface that facilitates modifications to HSL parameters across different colors in a visible light spectrum, while providing immediate visual feedback based on the modifications. A content-editing application initiates the HSL-modification process by extracting a set of color sub-spectrums an image. As an illustrative example, the content-editing application retrieves an image depicting a fruit basket and extracts, from the image, a first color sub-spectrum having shades of colors red and orange and a second color sub-spectrum includes shades of colors blue and purple.

The content-editing application displays, on a graphical user interface, an interactive graph for a particular color sub-spectrum of the set of color sub-spectrums. Continuing with the example, the graphical user interface displays the image and a set of control elements used for editing the image. Using one of the control elements, the user selects a blue and purple sub-spectrum, at which the interactive graph corresponding to the blue and purple sub-spectrum is concurrently displayed with the image. The interactive graph identifies a distribution of color frequencies within the particular color sub-spectrum. Continuing with the example, the interactive graph identifies the distribution of blue and purple colors across the image. The interactive graph includes: (i) a horizontal axis that corresponds to each column (e.g., a pixel-wide column region, a column region covering a predetermined number of pixels) of the image; and (ii) a vertical axis identifies an amount of blue and purple colors depicted by a corresponding column of the image.

The content-editing application detects a first interaction relative to a first dimension of the interactive graph. Continuing with the example, the user drags a user-interface element (e.g., vertical bars) along the horizontal axis of the interactive graph. Based on the first interaction, the content-editing application selects one or more colors of the particular color sub-spectrum in response to the first interaction. Continuing with the example, the content-editing application selects the color blue after determining that the horizontal axis was dragged to select the blue color from the blue and purple color sub-spectrum.

Before or after the colors are selected through the first interaction, the content-editing application detects a second interaction relative to a second dimension of the interactive graph. Continuing with the example, the user drags a cursor up the vertical axis of the interactive graph. Based on the second interaction, the content-editing application modifies hue, saturation, or luminance parameters associated with the selected colors. As a result, the image is dynamically updated based on the modified hue, saturation, or luminance parameters. Continuing with the example, the dragging up of the cursor increases saturation parameter of the selected blue color, in which the graphical user interface modifies the image based on the increased saturation parameter. In some instances, the distribution of color frequencies of the interactive graph is dynamically updated in accordance with the modified hue, saturation, or luminance parameters. The updating of the color-frequency distribution provides a visual feedback on how the modified HSL parameters affect the colors (e.g., blue and purple colors) of the sub-spectrum.

The content-editing application generates a color-adjusted image by applying the modified hue, saturation, or luminance parameters to one or more pixels of the image that correspond to the selected colors. Continuing with the example, when the saturation parameter is increased, the content-editing application adjusts the brightness values for each pixel of the blue color, based on the modified saturation parameters. The content-editing application displays the color-adjusted image on the graphical user interface. Continuing with the example, the graphical user interface displays the color-adjusted image that includes the brighter or darker pink color. The user can save the changes corresponding to the color-adjusted image and iterate through the color-adjustment process to further modify hue, saturation, or luminance parameters of other colors present in the image. Additionally or alternatively, the user can revert the changes to the color-adjusted image, and iterate through the color-adjustment process to further modify hue, saturation, or luminance parameters of other colors present in the image.

The interactive graph thus provides the immediate visual feedback by dynamically changing the color-frequency distributions, which assists the users to understand the effects of their modifications to the HSL parameters. In this manner, the present techniques prevent overly complex or unnatural color changes, thus reducing the likelihood of artifacts or undesirable visual effects. In some implementations, the present techniques are also used for video editing, in which the HSL adjustments are automatically propagated across video frames to maintain consistency in color grading the video.

The present techniques thus provide a significant improvement over existing content-editing tools by merging advanced color-correction capabilities with a user-friendly design. The present techniques not only reduce the complexity associated with the HSL interdependent relationships but also decrease the time needed for adjusting colors within an image or video. The increased usability can ultimately expand creative possibilities for users of varying image-editing skill levels.

I. GRAPHICAL USER INTERFACE FOR MODIFYING HUE, SATURATION, AND LUMINANCE PARAMETERS OF COLORS

A. Example Implementation

FIG. 1 illustrates an example screenshot of a graphical user interface 100 for modifying hue, saturation, and luminance parameters across different colors depicted on an image, according to some embodiments. A content-editing application extracts a set of color sub-spectrums 102 from an input image 104. A color sub-spectrum includes a range of adjacent colors within a visible light spectrum (between 380 nm for violet light and 750 nm for red light). In this example, the content-editing application provides the set of color sub-spectrums 102 on the graphical user interface 100, which include light-brown and brown colors, teal and dark green colors, blue and dark blue colors, purple and pink colors, and red color. In some instances, the user interacts with one or more portions of the input image 104 (e.g., click a region, dragging a cursor to select a region) to extract additional color sub-spectrums (e.g., that are not being displayed on the graphical user interface 100.

The user then selects a particular color sub-spectrum of the set of color sub-spectrums 102. As shown in FIG. 1, the user selects the pink and purple sub-spectrum, at which the graphical user interface 100 displays a set of control elements 106 for the pink and purple color sub-spectrum. In some implementations, the graphical user interface 100 identifies portions of the input image 104 that includes the selected color sub-spectrum, such as the pink color of the shirt 107 depicted by the input image 104. The set of control elements 106 includes a first control element is associated with a "saturation shift" category, a second control element is associated with a "hue shift" category, and a third control element is associated with a "luminance shift" category. The user can select and modify one of the HSL parameters for the colors within the selected color sub-spectrum (e.g., pink and purple colors). In this example, the user selects the first control element to modify the corresponding saturation parameter 108.

Once the saturation parameter 108 is selected, the content-editing application generates an interactive graph 110 for the corresponding saturation parameter 108. The interactive graph 100 identifies various characteristics of the selected color sub-spectrum, including a distribution of pink and purple frequencies of the input image 104 (for example). Continuing with the example, the user can interact with the interactive graph 110 across different axes to adjust and configure the saturation parameter 108. For example, the user drags a first interactive element 112 across the x-axis of the interactive graph 110, at which one or more colors of the color sub-spectrum (e.g., shades of pink) are identified. Then, the user drags a second interactive element 114 across the y-axis of the interactive graph 110 to modify the saturation parameter 108 for the colors defined by the first interactive element. The modification of the saturation parameter 108 can result in an updated distribution of color frequencies 116 within the pink and purple sub-spectrum within the input image 104. Moreover, the modified saturation parameter results in updating the affected colors shown in the input image 104, such as changing the pixel values of the pink shirt 107 depicted by the input image 104. In some implementations, the first control element to modify the corresponding saturation parameter 108 is also updated to visually indicate that the saturation has been modified for the selected colors.

The interactive graph 110 thus provides the immediate visual feedback to user interactions by dynamically changing the color-frequency distributions, which assists the users to understand the effects of their modifications to the HSL parameters. The present techniques prevent overly complex or unnatural color changes and reduce the likelihood of artifacts or undesirable visual effects. In some implementations, the present techniques are also used for video editing, in which the HSL adjustments are automatically propagated across video frames to maintain consistency in color grading the video.

Figure 2:
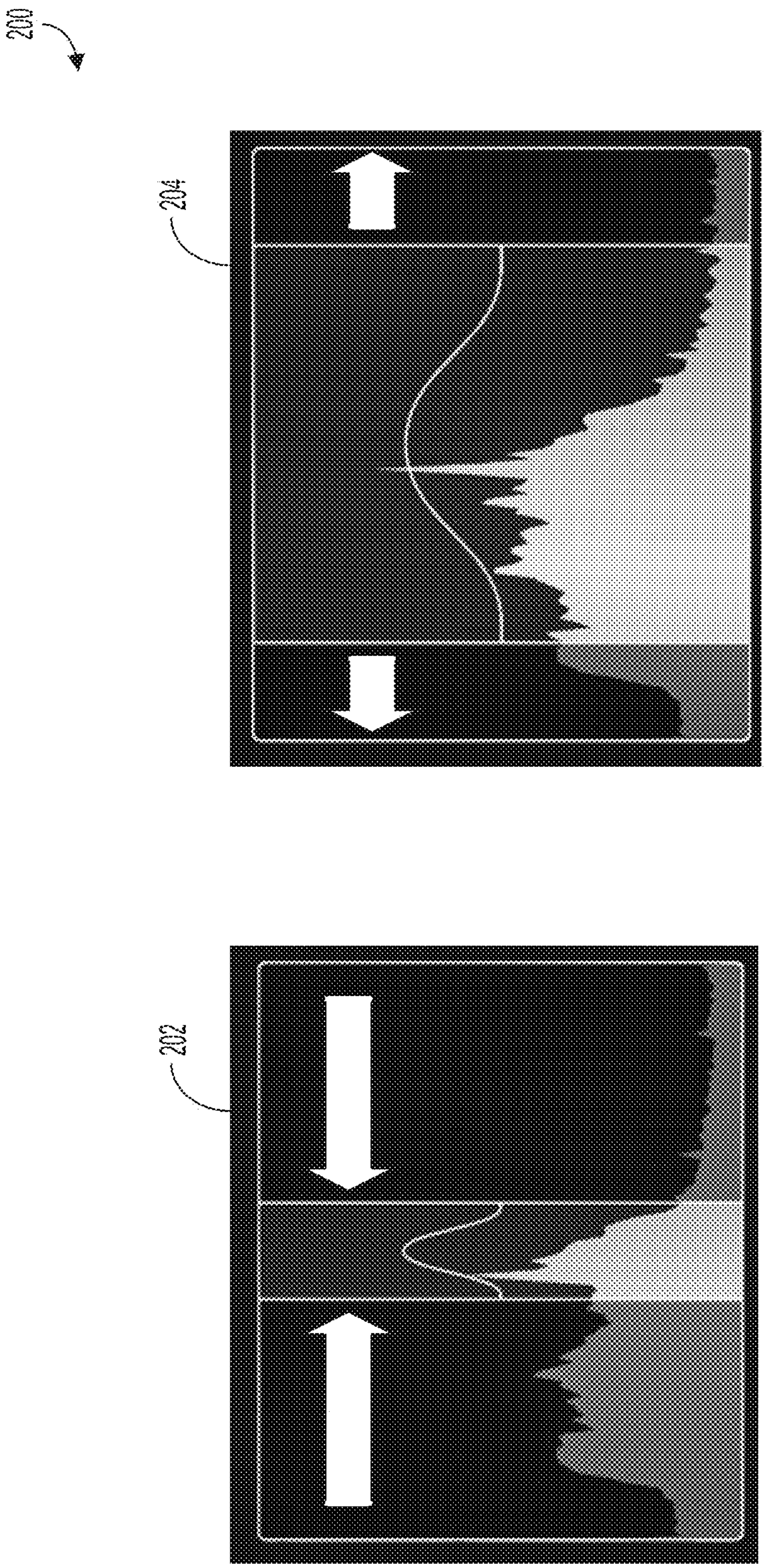
FIG. 2 shows example interactive graphs for selecting a color range for modifying hue, saturation, and luminance parameters, according to some embodiments.

FIG. 2 shows example interactive graphs 200 for selecting a color range for modifying hue, saturation, and luminance parameters, according to some embodiments. In FIG. 2, a first interactive graph 202 shows a user interaction that selects a narrow range of yellow and green sub-spectrum, which is typically performed by the user dragging (e.g., using a gesture, dragging a cursor) across the x-axis and towards the center of the first interactive graph 202. Once the narrow range is selected, the user modifies the HSL parameter such that the changes only affect the selected colors within the narrow range (e.g., the green color). Conversely, a second interactive graph 204 shows another user interaction that selects a wide range of yellow and green sub-spectrum, which is performed by the user dragging across the x-axis and away from the center of the second interactive graph 204. The user can similarly modify the HSL parameter such that the changes affect the colors within the wide range. The user can iterate the process of selecting the color range and modifying the HSL parameters to obtain the targeted color for the image.

Figure 3:
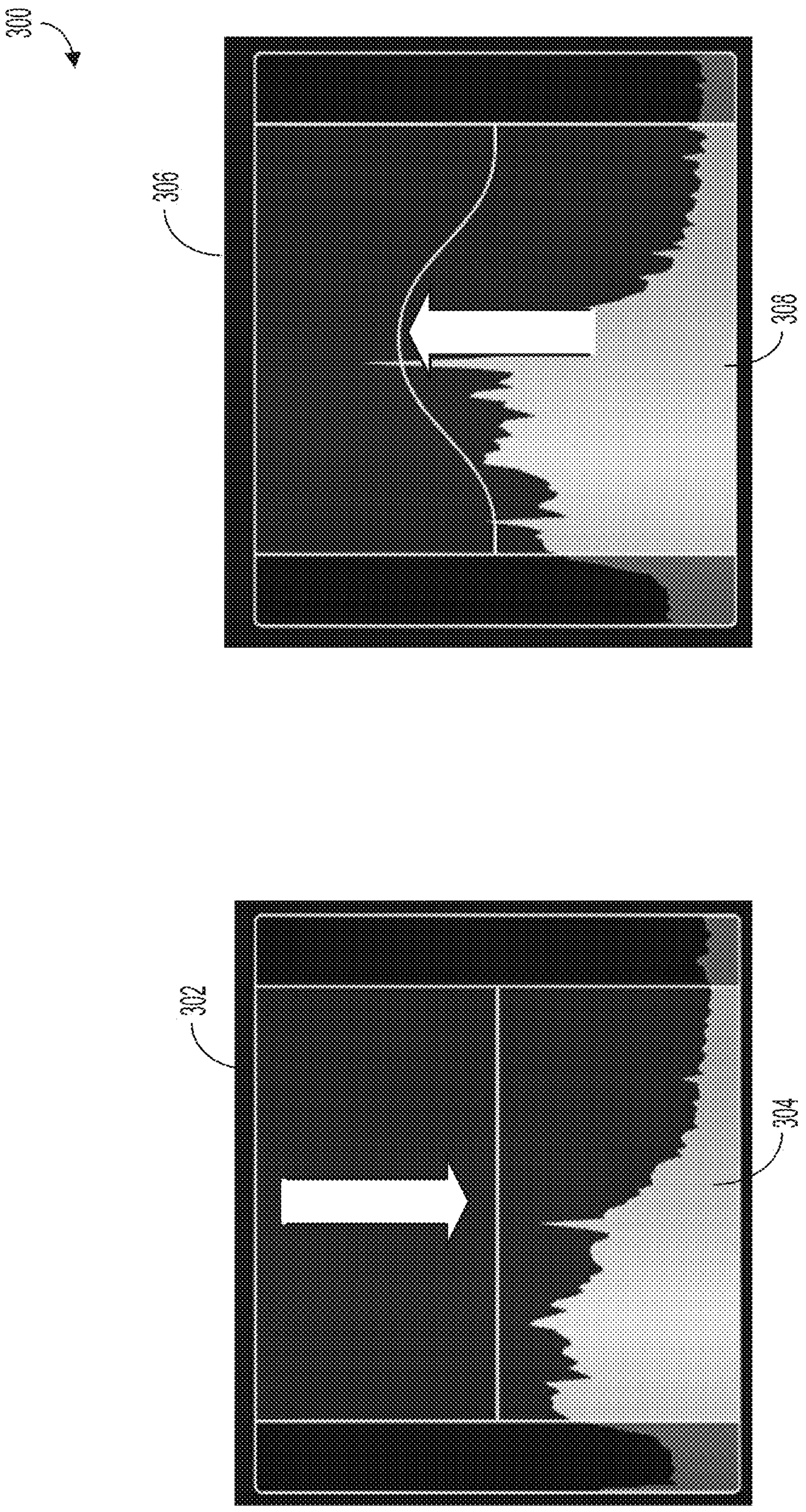
FIG. 3 shows example interactive graphs for modifying hue, saturation, and luminance parameters for a selected color range, according to some embodiments.

FIG. 3 shows example interactive graphs 300 for modifying hue, saturation, and luminance parameters for a selected color range, according to some embodiments. In FIG. 3, a first interactive graph 302 shows a user interaction that reduces luminance for the selected colors, which is typically performed by the user dragging (e.g., using a gesture, dragging a cursor) down across the y-axis. A first color distribution 304 for the green and yellow colors of the image are dynamically updated based on the reduced luminance. Conversely, a second interactive graph 306 shows a user interaction that increases luminance for the selected colors, which is performed by the user dragging up across the y-axis. A second color distribution 306 for the green and yellow colors of the image are dynamically updated based on the increased luminance.

B. Computing Environment

Figure 4:
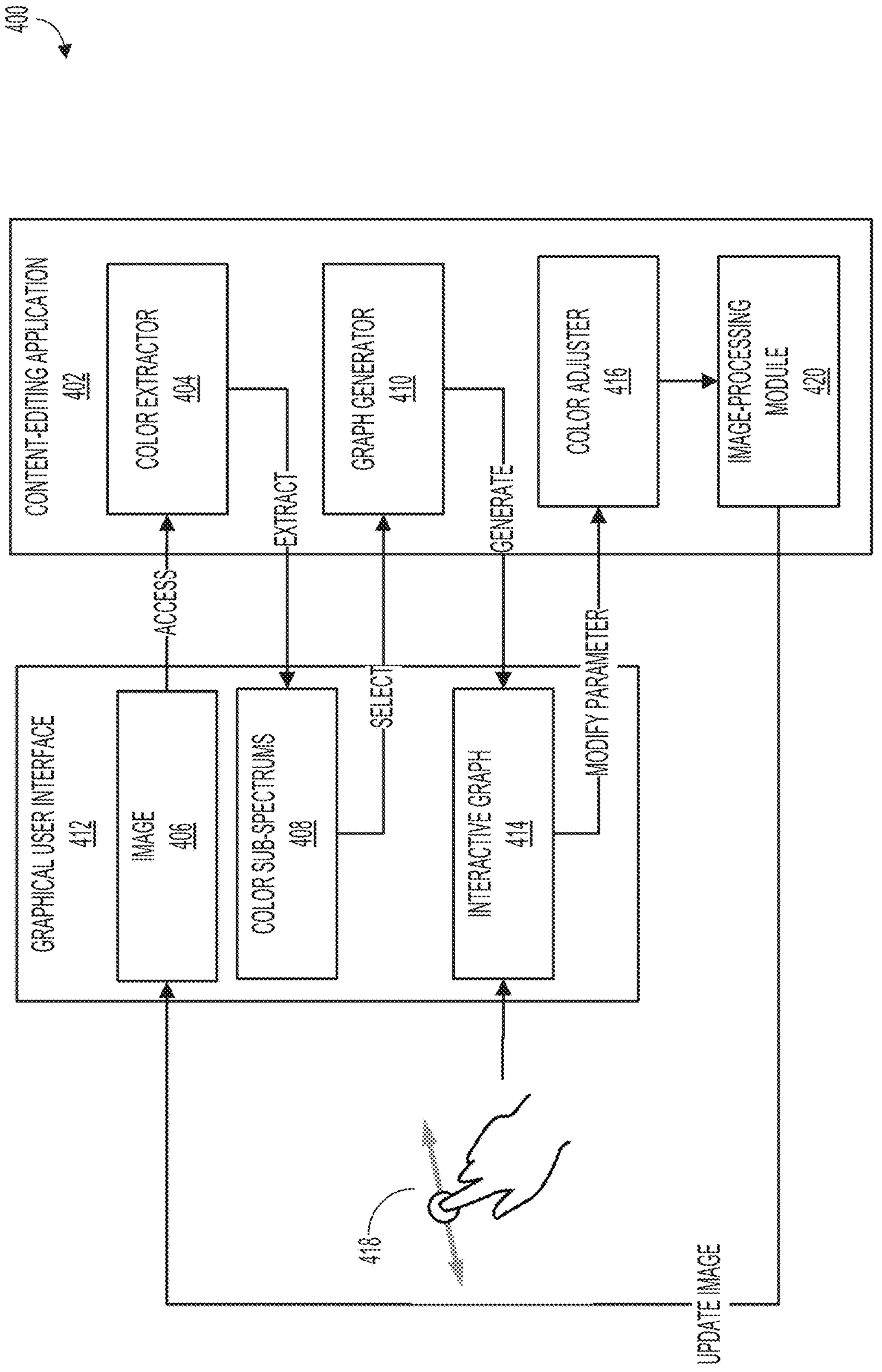
FIG. 4 illustrates an example computing environment for modifying hue, saturation, and luminance parameters across different colors depicted on an image, according to some embodiments.

FIG. 4 illustrates an example computing environment 400 for modifying hue, saturation, and luminance parameters across different colors depicted on an image, according to some embodiments. A color extractor 404 of the content-editing application 402 accesses an image 406 and extracts a set of color sub-spectrums 408 from the image 406. The set of color sub-spectrums 408 are subsets of a visible light spectrum. For example, a first color sub-spectrum includes shades of colors red and orange, and a second color sub-spectrum includes shades of colors blue and purple. A color sub-spectrum is configured to include two or more adjacent colors. The two or more adjacent colors allows the user to obtain visual feedback to changes in color properties of an adjacent color, in the event that the HSL parameters of a particular color is modified.

The image 406 includes a visual representation of a scene or an object captured by a camera device (e.g., a smartphone camera, video recorder). The image includes a matrix of pixels, in which each pixel identifies color (e.g., RGB values) and intensity information. The image 406 can be a video frame of a plurality of video frames. For example, the image 406 is a live-preview image of a particular video frame that is presented on the graphical user interface. Any modifications to the live-preview image can be performed and saved. Once saved, the modifications to the particular video frame propagates to other video frames, either through batch processing, scene-wide adjustments, or automated propagation based on predefined settings. In some instances, the image 406 is encoded in file formats such as JPEG, PNG, or TIFF. The image 406 can also be associated with metadata that identifies additional information about how or when the image 406 was captured.

To extract the set of color sub-spectrums 408 from the image 406, the color extractor 404 initially converts the image 406 from its default color space (e.g., RGB) to the HSL color space. The conversion to the HSL color space can facilitate manipulation and extraction of colors based on hue, saturation, and lightness, which are more closely aligned with how humans perceive colors. The color extractor 404 then classifies the pixels of the image 406 based on their hue values, as different ranges of hue values correspond to different basic colors (e.g., reds, greens, blues). For example, a pixel is classified with a hue value between 0° and 30° as red. In some implementations, the color extractor 404 filters one or more pixels with low saturation (which tend to be grayscale or dull) or very high lightness (which may be too close to white to have strong color). Additionally or alternatively, the color extractor 404 discards pixels having very low lightness values, as they would be too close to black.

Once the pixels are classified based on their hue, the color extractor 404 groups the classified pixels into color sub-spectrums based on their corresponding colors. In some instances, the color extractor 404 generates image masks that identify regions of the image 406 that are associated with the set of color sub-spectrums 408. As a result, different regions of the image 406 are selectively identified based on their corresponding color sub-spectrums.

A graph generator 410 of the content-editing application 402 receives a selection of a particular color sub-spectrum of the set of color sub-spectrums 408. For example, a user selects the purple and pink sub-spectrum that is being displayed on a graphical user interface 412. In some implementations, the graphical user interface 412 identifies portions of the image 406 that includes the selected color sub-spectrum.

The graph generator 410 generates an interactive graph 414, which is displayed on the graphical user interface 412. Continuing with the example, the interactive graph 414 corresponding to the purple and pink sub-spectrum is displayed on the graphical user interface 412. The interactive graph 414 (e.g., the interactive graphs 200 of FIG. 2, the interactive graphs 300 of FIG. 3) identifies a distribution of color frequencies within the particular color sub-spectrum. Continuing with the example, the interactive graph 414 identifies the distribution of purple and pink colors across the image 406, in which a horizontal axis of the interactive graph 414 identifies each column of the image 406 and a vertical axis identifies an amount of purple and pink colors depicted by a corresponding column of the image 406.

The user can interact with the interactive graph 414 to adjust values of a corresponding color parameter. For example, the graphical user interface 412 displays a set of color-control elements for the particular color sub-spectrum (e.g., purple and pink colors). The graph generator 410 receives a selection of a first color-control element of the set of color-control elements, in which the first color-control element is associated with a luminance category. The graph generator 410 generates the interactive graph 414 for the luminance category.

In another example, the graph generator 410 receives a selection of a second color-control element of the set of color-control elements, in which the second color-control element is associated with a saturation category. The graph generator 410 generates the interactive graph 414 for the saturation category. In yet another example, the graph generator 410 receives a selection of a third color-control element of the set of color-control elements, in which the third color-control element is associated with a hue category. In such case, the graph generator 410 generates the interactive graph 414 for the hue category.

A color adjuster 416 of the content-editing application 402 detects various user interactions 418, including a first interaction relative to a first dimension of the interactive graph 414. The first interaction includes various gestures either through touch screens or with a mouse to interact with the interactive graph. For example, the first interaction includes a "drag" gesture along the horizontal axis of the interactive graph. Other gestures can be used, such as a "click and drag," in which the user holds down the left mouse button while moving the cursor along the horizontal axis of the interactive graph. The interaction along the horizontal axis facilitates selection of colors within the particular color sub-spectrum. The first interaction includes various types of actions that can be inputted into the graphical user interface 412, including but not limited to swiping, clicking, tapping, moving a cursor along the x-axis without clicking, selecting a region in the image 406, drawing boundaries of the region for selecting colors within the color sub-spectrum, pressing arrow buttons in a keyboard, etc.

The color adjuster 416 selects one or more colors of the particular color sub-spectrum in response to the first interaction. Continuing with the example, the color adjuster 416 selects the color pink after determining that the horizontal axis was dragged to select the pink color from the purple and pink color sub-spectrum.

In some implementations, the user interactions 418 additionally includes a second interaction relative to a second dimension of the interactive graph 414. Similar to the first interaction, the second interaction includes a "drag" gesture along a vertical axis of the interactive graph. For example, the second interaction corresponds to dragging the cursor across the vertical axis, which results in modifying a color parameter associated with the selected colors. The second interaction also includes various types of actions that can be inputted into the graphical user interface 412, including but not limited to swiping, clicking, tapping, moving a cursor along the y-axis without clicking, pressing arrow buttons in a keyboard, etc.

The color adjuster 416 modifies hue, saturation, or luminance parameters associated with the one or more colors in response to the second interaction. The image 406 is dynamically updated based on the modified hue, saturation, or luminance parameters. In addition, the distribution of color frequencies of the interactive graph is dynamically updated in accordance with the modified hue, saturation, or luminance parameters.

An image-processing module 420 of the content-editing application 402 generates a color-adjusted image by applying the modified hue, saturation, or luminance parameters to one or more pixels of the image that correspond to the selected colors. Continuing with the example, when a luminance parameter is modified, the image-processing module 420 adjusts the brightness values for each pixel of the pink colors, based on the modified luminance parameters. For example, the luminance parameters are calculated from the corresponding pixel's pink-color information, using a weighted sum of the red, green, and blue (RGB) values. An example formula for luminance includes: $Y=0.2126R+0.7152G+0.0722B$, in which R, G, and B are the red, green, and blue color values of the pixel.

When the luminance parameter is modified, the image-processing module 420 recalculates the brightness of each pixel by scaling its RGB values according to the new luminance parameters. If the luminance is increased, the pixel's RGB values are proportionally increased to make the pink color appear brighter. Conversely, if the luminance is decreased, the pixel's RGB values are reduced to make the pink color appear darker. As an illustrative example, if the luminance parameter is increased by 20%, the image-processing module 420 multiplies the original RGB values by 1.2 for each pixel and recalculates their corresponding luminance to update the overall brightness. The adjustments ensure that the pixel's color balance remains intact, but its intensity is scaled up to reflect the modified luminance parameter. After this recalculation, the modified pixel values are written back to the image buffer, thus updating the visual output. The updating process continues for every pixel associated with the selected colors, until the selected colors of the image reflect the modified luminance parameter. The result is a uniformly brighter or darker pink color, depending on the change made to the luminance parameter.

The graphical user interface 412 displays the color-adjusted image (e.g., brighter or darker pink color). The user can save the changes corresponding to the color-adjusted image and iterate through the color-adjustment process to further modify hue, saturation, or luminance parameters of other colors present in the image. In some instances, if the image 406 corresponds to a particular video frame, the content-editing application 402 applies the modified hue, saturation, or luminance parameters to other video frames of the plurality of video frame. Additionally or alternatively, the user can revert the changes to the color-adjusted image, and iterate through the color-adjustment process to further modify hue, saturation, or luminance parameters of other colors present in the image 406.

C. Methods

Figure 5:
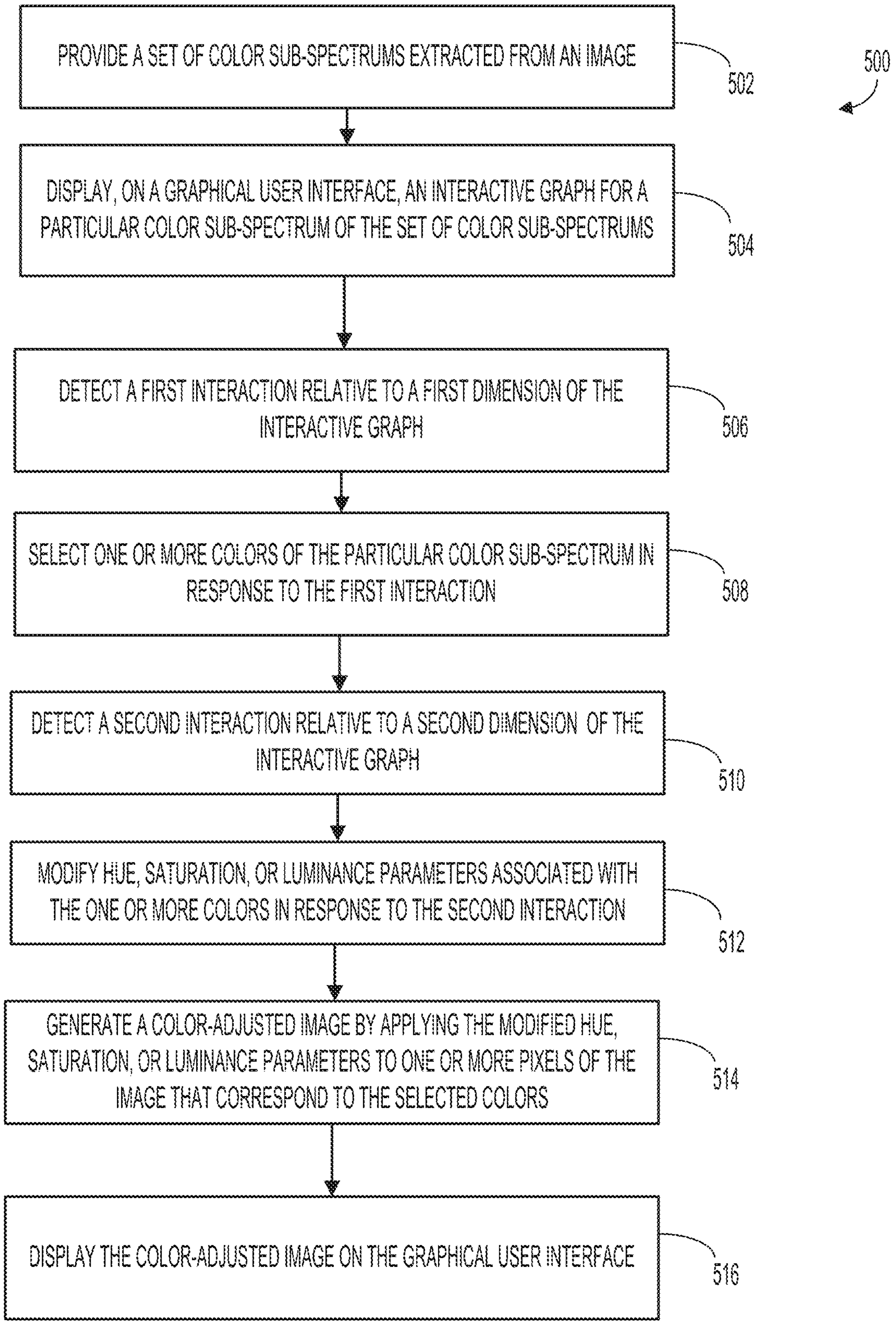
FIG. 5 shows an illustrative example of a process for modifying hue, saturation, and luminance parameters across different colors depicted on an image, according to some embodiments, according to some embodiments.

FIG. 5 shows an illustrative example of a process 500 for modifying hue, saturation, and luminance parameters across different colors depicted on an image, according to some embodiments, according to some embodiments. For illustrative purposes, the process 500 is described with reference to the components illustrated in FIGS. 1-4, though other implementations are possible. For example, the program code for the content-editing application 402 of FIG. 4, is executed by one or more processing devices to cause a server system (e.g., the computing device 602 of FIG. 6) to perform one or more operations described herein.

At step 502, the content-editing application provides a set of color sub-spectrums extracted from an image. The set of color sub-spectrums are subsets of a visible light spectrum. For example, a first color sub-spectrum includes shades of colors red and orange, and a second color sub-spectrum includes shades of colors purple and pink. The image includes a visual representation of a scene or an object captured by a camera device (e.g., a smartphone camera, video recorder). The image includes a matrix of pixels, in which each pixel identifies color (e.g., RGB values) and intensity information. The image is a video frame of a plurality of video frames. For example, the image is a live-preview image of a particular video frame that is presented on the graphical user interface. Any modifications to the live-preview image are performed and saved. Once saved, the modifications to the particular video frame propagates to other video frames, either through batch processing, scene-wide adjustments, or automated propagation based on predefined settings. In some instances, the image is encoded in file formats such as JPEG, PNG, or TIFF. The image can also be associated with metadata that identifies additional information about how or when the image was captured.

At step 504, the content-editing application displays, on a graphical user interface, an interactive graph for a particular color sub-spectrum of the set of color sub-spectrums. For example, a user selects the purple and pink sub-spectrum, and the interactive graph corresponding to the purple and pink sub-spectrum is displayed on the graphical user interface. The interactive graph includes a distribution of color frequencies within the particular color sub-spectrum. Continuing with the example, the interactive graph identifies the distribution of purple and pink colors across the image, in which a horizontal axis of the interactive graph identifies each column (e.g., a pixel-wide column region, a column region covering a predetermined number of pixels) of the image and a vertical axis identifies an amount of purple and pink colors depicted by a corresponding column of the image.

The interactive graph is configured to be used to adjust values of a corresponding color parameter. For example, the content-editing application displays a set of color-control elements for the particular color sub-spectrum (e.g., purple and pink colors). The content-editing application receives a selection of a first color-control element of the set of color-control elements, in which the first color-control element is associated with a luminance category. The content-editing application generates the interactive graph for the luminance category.

In another example, the content-editing application receives a selection of a second color-control element of the set of color-control elements, in which the second color-control element is associated with a saturation category. The content-editing application generates the interactive graph for the saturation category. In yet another example, the content-editing application receives a selection of a third color-control element of the set of color-control elements, in which the third color-control element is associated with a hue category. In such case, the content-editing application generates the interactive graph for the hue category.

At step 506, the content-editing application detects a first interaction relative to a first dimension of the interactive graph. The first interaction includes various gestures either through touch screens or with a mouse to interact with the interactive graph. For example, the first interaction includes a "drag" gesture along the horizontal axis of the interactive graph. Other gestures can be used, such as a "click and drag," in which the user holds down the left mouse button while moving the cursor along the horizontal axis of the interactive graph. The interaction along the horizontal axis facilitates selection of colors within the particular color sub-spectrum.

At step 508, the content-editing application selects one or more colors of the particular color sub-spectrum in response to the first interaction. Continuing with the example, the content-editing application selects the color pink after determining that the horizontal axis was dragged to select the pink color from the purple and pink color sub-spectrum.

At step 510, the content-editing application detects a second interaction relative to a second dimension of the interactive graph. Similar to the first interaction, the second interaction includes a "drag" gesture along a vertical axis of the interactive graph. For example, the second interaction corresponds to dragging the cursor across the vertical axis, which results in modifying a color parameter associated with the selected colors.

At step 512, the content-editing application modifies hue, saturation, or luminance parameters associated with the one or more colors in response to the second interaction. The second interaction thus causes the hue, saturation, or luminance parameters of the selected colors to be modified, and the image is dynamically updated based on the modified hue, saturation, or luminance parameters. In addition, the distribution of color frequencies of the interactive graph is dynamically updated in accordance with the modified hue, saturation, or luminance parameters.

At step 514, the content-editing application generates a color-adjusted image by applying the modified hue, saturation, or luminance parameters to one or more pixels of the image that correspond to the selected colors. Continuing with the example, when a luminance parameter is modified, the content-editing application adjusts the brightness values for each pixel of the pink colors, based on the modified luminance parameters. For example, the luminance parameters are calculated from the corresponding pixel's pink-color information, using a weighted sum of the red, green, and blue (RGB) values. An example formula for luminance includes: $Y=0.2126R+0.7152G+0.0722B$, in which R, G, and B are the red, green, and blue color values of the pixel.

When the luminance parameter is modified, the content-editing application recalculates the brightness of each pixel by scaling its RGB values according to the new luminance parameters. If the luminance is increased, the pixel's RGB values are proportionally increased to make the pink color appear brighter. Conversely, if the luminance is decreased, the pixel's RGB values are reduced to make the pink color appear darker. As an illustrative example, if the luminance parameter is increased by 20%, the content-editing application multiplies the original RGB values by 1.2 for each pixel and recalculates their corresponding luminance to update the overall brightness. The adjustments ensure that the pixel's color balance remains intact, but its intensity is scaled up to reflect the modified luminance parameter. After this recalculation, the modified pixel values are written back to the image buffer, thus updating the visual output. The updating process continues for every pixel associated with the selected colors, until the selected colors of the image reflect the modified luminance parameter. The result is a uniformly brighter or darker pink color, depending on the change made to the luminance parameter.

At step 516, the content-editing application displays the color-adjusted image on the graphical user interface. Continuing with the example, the graphical user interface displays the color-adjusted image that includes the brighter or darker pink color. The user can save the changes corresponding to the color-adjusted image and iterate through the steps 506-516 to further modify hue, saturation, or luminance parameters of other colors present in the image. In some instances, if the image corresponds to a particular video frame, the content-editing application applies the modified hue, saturation, or luminance parameters to other video frames of the plurality of video frame. Additionally or alternatively, the user can revert the changes to the color-adjusted image, and iterate through the steps 506-516 to further modify hue, saturation, or luminance parameters of other colors present in the image. Process 500 terminates thereafter.

II. EXAMPLE SYSTEMS

Figure 6:
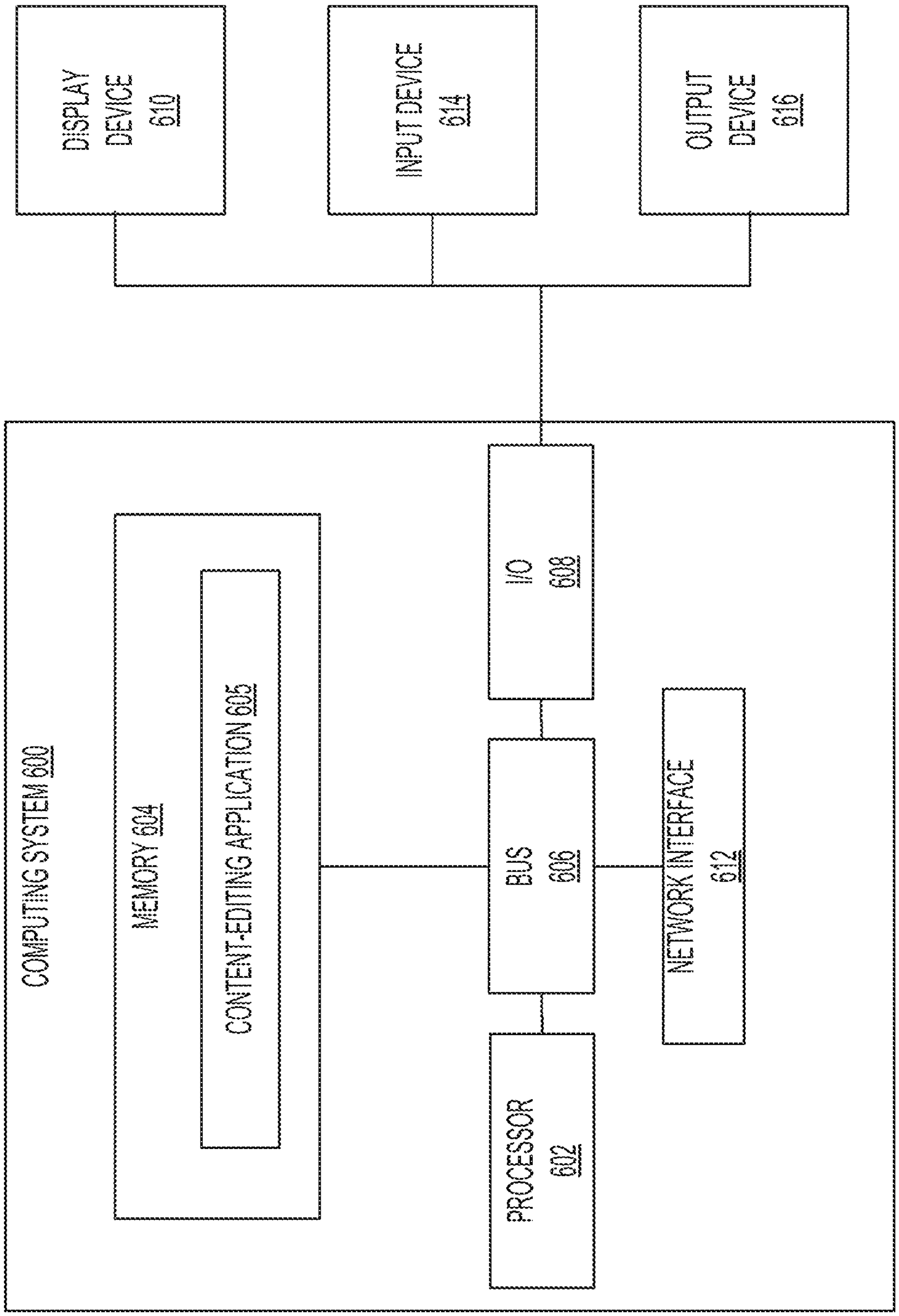
FIG. 6 shows a computing system architecture including various components in electrical communication with each other using a connection in accordance with various embodiments.

Any suitable computing system or group of computing systems can be used for performing the operations described herein. For example, FIG. 6 depicts a computing system 600 that can implement any of the computing systems or environments discussed above. In some embodiments, the computing system 600 includes a processing device 602 that executes the content-editing application 605, a memory that stores various data computed or used by the content-editing application 605, an input device 614 (e.g., a mouse, a stylus, a touchpad, a touch-screen, etc.), and an output device 616 that presents output to a user (e.g., a display device that displays graphical content generated by content-editing application 605). For illustrative purposes, FIG. 6 depicts a single computing system on which the content-editing application 605 is executed, and the input device 614 and output device 616 are present. But these applications, datasets, and devices can be stored or included across different computing systems having devices similar to the devices depicted by FIG. 6.

The example of FIG. 6 includes a processing device 602 communicatively coupled to one or more memory devices 604. The processing device 602 executes computer-executable program code stored in a memory device 604, accesses information stored in the memory device 604, or both. Examples of the processing device 602 include a microprocessor, an application-specific integrated circuit ("ASIC"), a field-programmable gate array ("FPGA"), or any other suitable processing device. The processing device 602 can include any number of processing devices, including a single processing device.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions could include processor-specific instructions generated by a compiler or an interpreter from code written in any suitable computer-programming language, including, for example, C, C++, C #, Visual Basic, Java, Python, Perl, JavaScript, and ActionScript.

The computing system 600 could also include a number of external or internal devices, such as a display device 610, or other input or output devices. For example, the computing system 600 is shown with one or more input/output ("I/O") interfaces 608. An I/O interface 608 can receive input from input devices or provide output to output devices. One or more buses 606 are also included in the computing system 600. Each bus 606 communicatively couples one or more components of the computing system 600 to each other or to an external component.

The computing system 600 executes program code that configures the processing device 602 to perform one or more of the operations described herein. The program code includes, for example, code implementing the document-processing application 102 or other suitable applications that perform one or more operations described herein. The program code can be resident in the memory device 604 or any suitable computer-readable medium and can be executed by the processing device 602 or any other suitable processor. In some embodiments, all modules in the content-editing application 605 are stored in the memory device 604, as depicted by FIG. 6. In additional or alternative embodiments, one or more of these modules from the content-editing application 605 are stored in different memory devices of different computing systems.

In some embodiments, the computing system 600 also includes a network interface device 612. The network interface device 612 includes any device or group of devices suitable for establishing a wired or wireless data connection to one or more data networks. Non-limiting examples of the network interface device 612 include an Ethernet network adapter, a modem, and/or the like. The computing system 600 is able to communicate with one or more other computing devices (e.g., a computing device that receives inputs for document-processing application 102 or displays outputs of the document-processing application 102) via a data network using the network interface device 612.

An input device 614 can include any device or group of devices suitable for receiving visual, auditory, or other suitable input that controls or affects the operations of the processing device 602. Non-limiting examples of the input device 614 include a touchscreen, stylus, a mouse, a keyboard, a microphone, a separate mobile computing device, etc. An output device 616 can include any device or group of devices suitable for providing visual, auditory, or other suitable sensory output. Non-limiting examples of the output device 616 include a touchscreen, a monitor, a separate mobile computing device, etc.

Although FIG. 6 depicts the input device 614 and the output device 616 as being local to the computing device that executes the document-processing application 102, other implementations are possible. For instance, in some embodiments, one or more of the input device 614 and the output device 616 include a remote client-computing device that communicates with the computing system 600 via the network interface device 612 using one or more data networks described herein.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:

providing a set of color sub-spectrums extracted from an image, wherein the set of color sub-spectrums are subsets of a visible light spectrum;

displaying, on a graphical user interface, an interactive graph for a particular color sub-spectrum of the set of color sub-spectrums, wherein the interactive graph includes a distribution of color frequencies within the particular color sub-spectrum;

detecting a first interaction relative to a first dimension of the interactive graph;

selecting one or more colors of the particular color sub-spectrum in response to the first interaction;

detecting a second interaction relative to a second dimension of the interactive graph;

modifying hue, saturation, or luminance parameters associated with the one or more colors in response to the second interaction, wherein the distribution of color frequencies of the interactive graph is dynamically updated in accordance with the modified hue, saturation, or luminance parameters;

generating a color-adjusted image by applying the modified hue, saturation, or luminance parameters to one or more pixels of the image, wherein the one or more pixels depict the one or more colors; and displaying the color-adjusted image on the graphical user interface.

2. The method of claim 1, wherein the second interaction corresponds to modifying the hue parameter associated with the particular hue, and wherein the distribution of color frequencies of the interactive graph is updated in accordance with the modified hue parameter.

3. The method of claim 1, wherein displaying the interactive graph includes:

displaying, on the graphical user interface, a set of color-control elements for the particular color sub-spectrum;

receiving a selection of a first color-control element of the set of color-control elements, wherein the first color-control element is associated with a luminance category; and generating the interactive graph for the luminance category, wherein the second interaction is associated with modifying the luminance parameter.

4. The method of claim 1, wherein displaying the interactive graph includes:

displaying, on the graphical user interface, a set of color-control elements for the particular color sub-spectrum;

receiving a selection of a second color-control element of the set of color-control elements, wherein the second color-control element is associated with a saturation category; and generating the interactive graph for the saturation category, wherein the second interaction is associated with modifying the saturation parameter.

5. The method of claim 1, wherein displaying the interactive graph includes:

displaying, on the graphical user interface, a set of color-control elements for the particular color sub-spectrum;

receiving a selection of a third color-control element of the set of color-control elements, wherein the third color-control element is associated with a hue category; and generating the interactive graph for the hue category, wherein the second interaction is associated with modifying the hue parameter.

6. The method of claim 1, wherein the image corresponds to a video frame of a plurality of video frames, wherein the method further comprises applying the modified hue, saturation, or luminance parameters to other video frames of the plurality of video frame.

7. The method of claim 1, wherein displaying the interactive graph includes identifying one or more regions of the image that depict colors associated with the particular color sub-spectrum.

8. A system comprising:
one or more processors; and
a non-transitory computer-readable medium storing instructions that when executed by the one or more processors, cause the one or more processors to perform operations including:
providing an interactive graph for a color sub-spectrum extracted from a particular video frame of a set of video frames, wherein the interactive graph includes a distribution of color frequencies within the color sub-spectrum, and wherein the set of video frames depict one or more image objects having the color sub-spectrum;
detecting one or more interactions with the interactive graph;
modifying a color parameter associated with the one or more colors within the color sub-spectrum, wherein the color parameter is one of hue, saturation, or luminance parameter;
generating color-adjusted video frames by applying the modified color parameter to one or more pixels of each video frame of the set of video frames, wherein the one or more pixels depict the one or more colors within the color sub-spectrum.

9. The system of claim 8, wherein the color parameter is a hue parameter, and wherein the distribution of color frequencies of the interactive graph is dynamically updated in accordance with the modified hue parameter.

10. The system of claim 8, wherein providing the interactive graph includes:
receiving a selection of a color-control element displayed on a graphical user interface, wherein the color-control element is associated with a luminance category; and
generating the interactive graph for the luminance category, wherein modifying the color parameter includes modifying the luminance parameter.

11. The system of claim 8, wherein displaying the interactive graph includes:
receiving a selection of a color-control element displayed on a graphical user interface, wherein the color-control element is associated with a saturation category; and
generating the interactive graph for the saturation category, wherein modifying the color parameter includes modifying the saturation parameter.

12. The system of claim 8, wherein the interactive graph includes: (i) a first dimension configured to select the one or more colors based on the one or more interactions; and (ii) a second dimension configured to adjust the color parameter based on the one or more interactions.

13. The system of claim 8, wherein providing the interactive graph includes identifying one or more regions of the video frame that depict colors associated with the color sub-spectrum.

14. A non-transitory computer-readable medium storing instructions that when executed by one or more processors, cause the one or more processors to perform operations including:
providing a set of color sub-spectrums extracted from an image, wherein the set of color sub-spectrums are subsets of a visible light spectrum;
displaying, on a graphical user interface, an interactive graph for a particular color sub-spectrum of the set of color sub-spectrums, wherein the interactive graph includes a distribution of color frequencies within the particular color sub-spectrum;
detecting a first interaction relative to a first dimension of the interactive graph;
selecting one or more colors of the particular color sub-spectrum in response to the first interaction;
detecting a second interaction relative to a second dimension of the interactive graph;
modifying hue, saturation, or luminance parameters associated with the one or more colors in response to the second interaction, wherein the distribution of color frequencies of the interactive graph is dynamically updated in accordance with the modified hue, saturation, or luminance parameters;
generating a color-adjusted image by applying the modified hue, saturation, or luminance parameters to one or more pixels of the image, wherein the one or more pixels depict the one or more colors; and
displaying the color-adjusted image on the graphical user interface.

15. The non-transitory computer-readable medium of claim 14, wherein the second interaction corresponds to modifying the hue parameter associated with the particular hue, and wherein the distribution of color frequencies of the interactive graph is updated in accordance with the modified hue parameter.

16. The non-transitory computer-readable medium of claim 14, wherein displaying the interactive graph includes:
displaying, on the graphical user interface, a set of color-control elements for the particular color sub-spectrum;
receiving a selection of a first color-control element of the set of color-control elements, wherein the first color-control element is associated with a luminance category; and
generating the interactive graph for the luminance category, wherein the second interaction is associated with modifying the luminance parameter.

17. The non-transitory computer-readable medium of claim 14, wherein displaying the interactive graph includes:
displaying, on the graphical user interface, a set of color-control elements for the particular color sub-spectrum;
receiving a selection of a second color-control element of the set of color-control elements, wherein the second color-control element is associated with a saturation category; and
generating the interactive graph for the saturation category, wherein the second interaction is associated with modifying the saturation parameter.

18. The non-transitory computer-readable medium of claim 14, wherein displaying the interactive graph includes:
displaying, on the graphical user interface, a set of color-control elements for the particular color sub-spectrum;
receiving a selection of a third color-control element of the set of color-control elements, wherein the third color-control element is associated with a hue category; and
generating the interactive graph for the hue category, wherein the second interaction is associated with modifying the hue parameter.

19. The non-transitory computer-readable medium of claim 14, wherein the image corresponds to a video frame of a plurality of video frames, wherein the instructions further cause the one or more processors to perform operations comprising:
applying the modified hue, saturation, or luminance parameters to other video frames of the plurality of video frame.

20. The non-transitory computer-readable medium of claim 14, wherein displaying the interactive graph includes identifying one or more regions of the image that depict colors associated with the particular color sub-spectrum.

* * * * *